INVENTOR.
HAROLD ERNEST SPAULDING
BY
Leonard R. Kohan
ATTORNEY

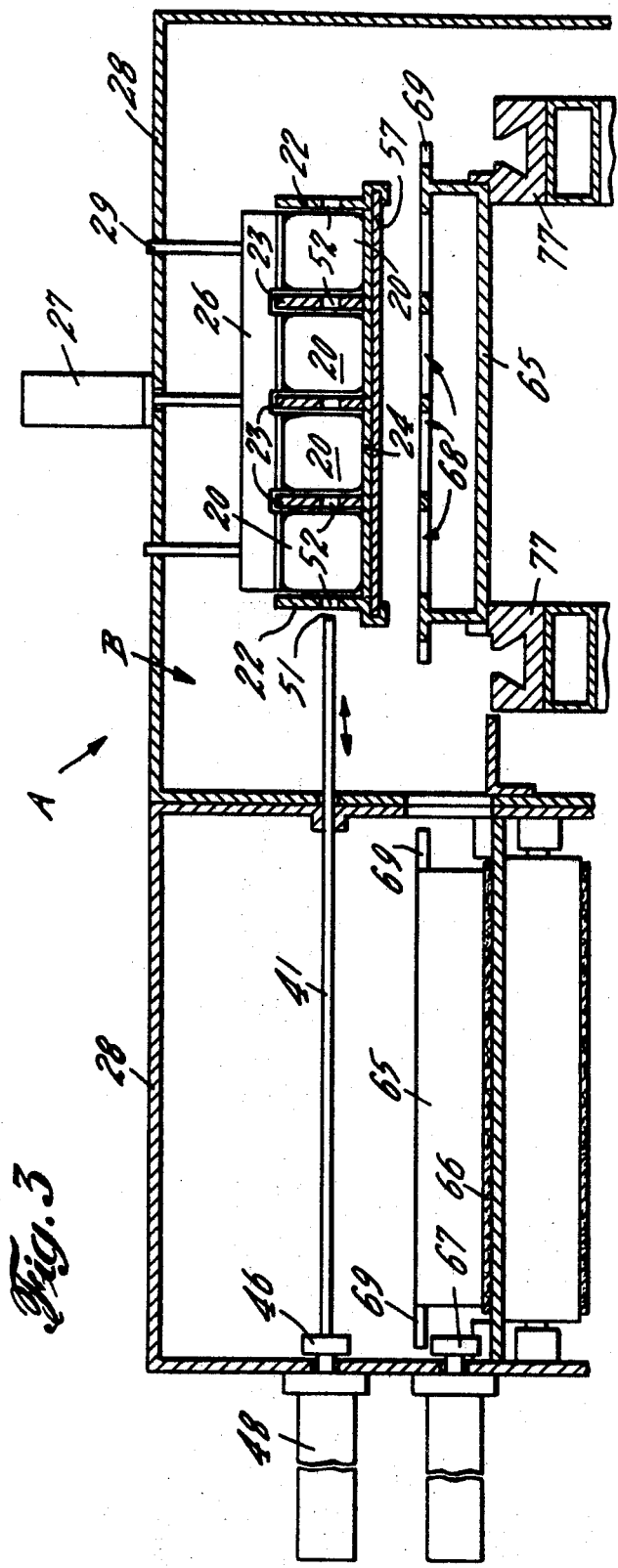

INVENTOR.
HAROLD ERNEST SPAULDING
BY
*Leonard R. Nolan*
ATTORNEY

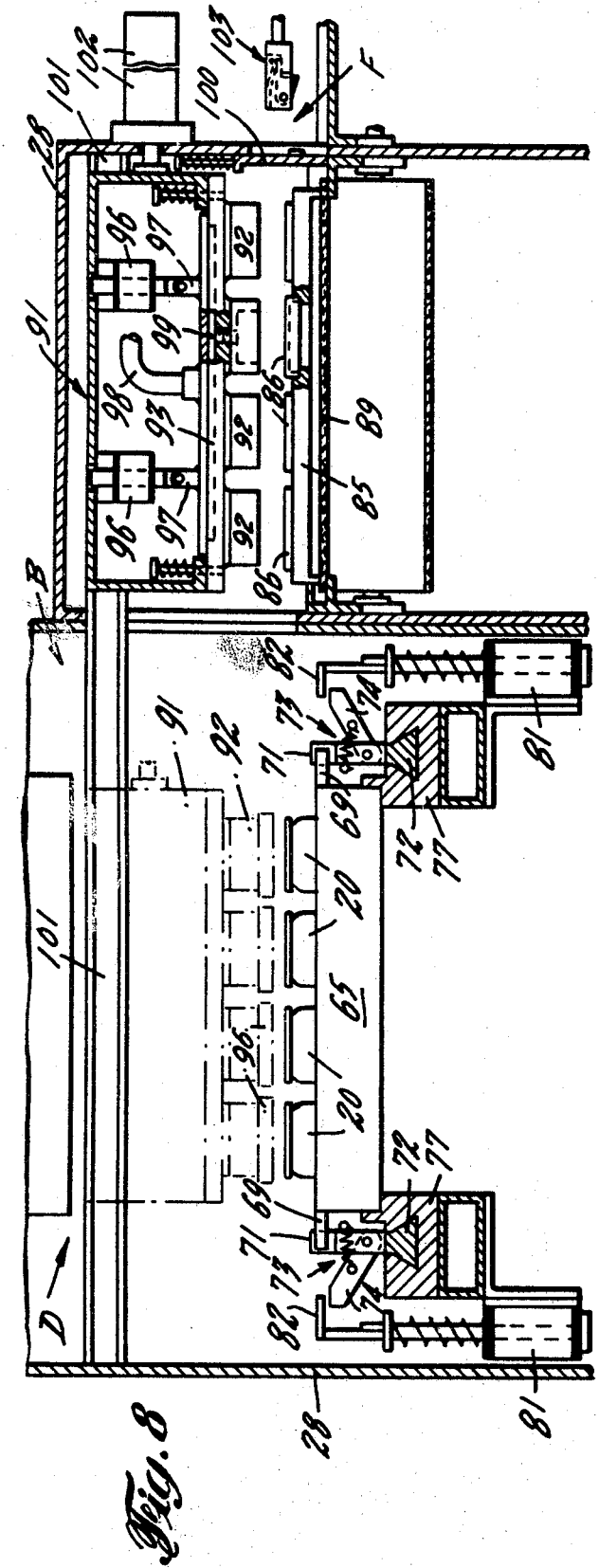

Aug. 18, 1970   H. E. SPAULDING   3,524,295
PROCESS FOR HANDLING AND TREATING ARTICLES IN GROUPS
Original Filed Oct. 22, 1965   6 Sheets-Sheet 6

INVENTOR.
HAROLD ERNEST SPAULDING
BY
Leonard R. Kohan
ATTORNEY

United States Patent Office 3,524,295
Patented Aug. 18, 1970

3,524,295
PROCESS FOR HANDLING AND TREATING
ARTICLES IN GROUPS
Harold Ernest Spaulding, Belle Mead, N.J., assignor to
American Can Company, New York, N.Y., a corporation of New Jersey
Original application Oct. 22, 1965, Ser. No. 501,630.
Divided and this application Oct. 8, 1968, Ser. No. 782,780
Int. Cl. B65b 21/06, 35/32
U.S. Cl. 53—14
5 Claims

ABSTRACT OF THE DISCLOSURE

A method for handling groups of articles so that a work function may be performed simultaneously upon each article in the group. A plurality of articles in bulk form are fed to a station where a group of the articles are arranged in a predetermined pattern and thereafter transferred into a matrix. The group of articles in the matix are moved into position within a working station in which the group of articles are worked on substantially simultaneously so that more time may be allowed to work on each article. The overall production rate may thus be increased as compared to working only on a single article at a time.

---

This application is a division of my co-pending application Ser. No. 501,630, filed Oct. 22, 1965, now U.S. Pat. 3,431,702.

The present invention relates generally to the handling and treatment of articles in groups, and more particularly to a process for arranging the articles in groups, each in a predetermined pattern, and for treating them while they are retained in the group pattern.

When it is desired to handle a large number of articles, the usual procedure of obtaining high production rates is to sub-divide the necessary operations into sub-operations, or partial work operations, and then employ progressive tooling. This requires that a simple step be done upon the article in a very short period of time. Thus, the high speed requirements of such a process generally require somewhat sophisticated machinery due to the high through-put rate necessary, even though each step is relatively simple.

If, on the other hand, a number of articles are worked upon substantially simultaneously by a group of identical tools performing a single operation, the rate of time to perform the work upon each article is significantly below that required if only a single article is worked upon at a time. This simultaneous multiple operation is a matrix system which has a broad front, or parallel path scheme of operation which performs high through-put rates, while operations and components function at a relatively slow rate. Thus, the limit to production rate imposed by tool operating speeds is not a critical limitation in the overall production rate of articles during a fixed period of time.

In addition, if it is desired to avoid tool interactions, such tools may not necessarily be operated simultaneously. Thus, alternate articles may be worked upon in the first operation and then the remainder of the articles worked upon in one or more subsequent operations.

It is thus apparent that such a matrix system will permit massive production using the combination of many channels of production operating at conventional tool speeds by combining the production channels into a single matrix path.

It is therefore an object of the present invention to provide a system wherein a group of articles is loaded into a matrix which retains them in a predetermined arrangement or pattern for subsequent treatment, in one or more operations, as a unit.

Another object of the invention is the provision of steps for handling and treating articles of different forms, each form being retained in the same pattern as the other within their respective matrices until the articles of one form are assembled with those of the other.

Still another object of the invention is the provision of steps for orienting and spacing the articles into the desired pattern preliminary to loading them into their matrices.

Yet another object of the invention is the provision of steps for substantially simultaneously treating and/or assembling articles, such as containers in patterned groups.

Other objects and advantages of the invention will become apparent from the following description which, together with the drawings, discloses a preferred embodiment of the invention.

Referring to the drawings:

FIG. 3 is a transverse elevational section taken at 3—3 in FIG. 1;

FIG. 4 is a repetition of a part of FIG. 3 with parts, shown at the right of the figure, in different positions;

FIG. 8 is a transverse elevational section taken at 8—8 in FIG. 1;

FIG. 9 is a transverse elevational section taken at 9—9 in FIG. 1; and

Figure 1:
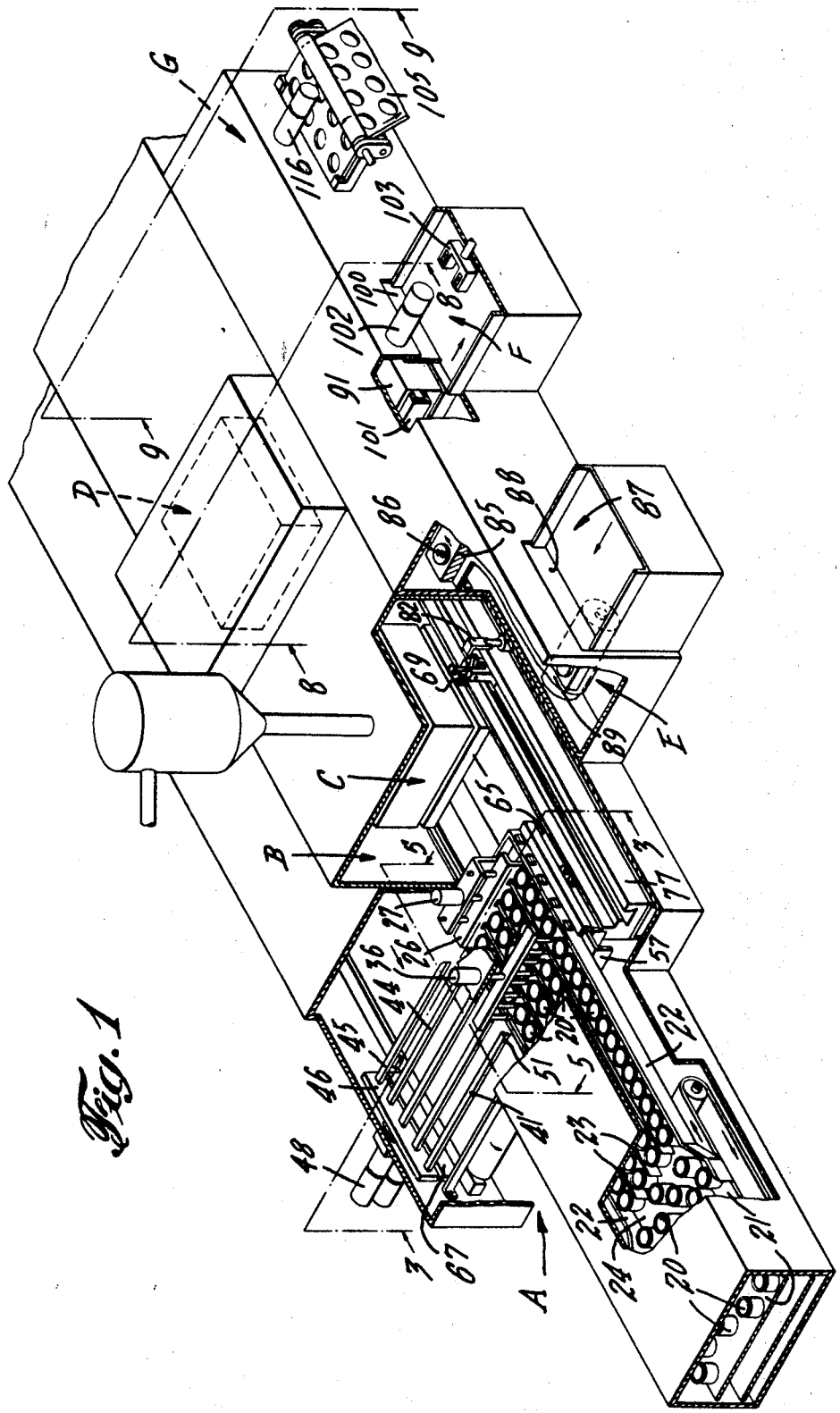
FIG. 1 is a portion of a schematic representation of means and their arrangement for effecting the first and some of the later steps of the process to be described below.

A preferred or exemplary embodiment of the instant invention is illustrated in the drawings which show a matrix system including an orienting and loading station A wherein containers are received, oriented and spaced in a desired pattern and placed within a reusable matrix which retains them in that pattern; a chamber B wherein the atmosphere is retained at other than normal conditions, such as sterile air or steam at a pressure higher than normal atmospheric pressure; a filler station C within the chamber B for filling the containers fed to it in successive matrices; a capper station D within the chamber B; a cap feed-in station E wherein caps, on matrices which retain them in the desired pattern, are fed into the capper station D for assembly therein with the filled containers; a cap matrix removal station F; a label and applying station G; a container transfer station H whereat the capped and labeled containers are transferred from their matrices and loaded, in the same pattern, into open cartons; and a carton sealing station J, where the filled cartons are closed and sealed.

As illustrated in FIG. 1 of the drawings, containers 20 are fed into the orienting and loading station A on a belt conveyor 21. Side guides 22 direct laterally disposed cans inwardly and together with a plurality of spacer guides 23, orient the containers into the desired number of lanes, four as shown, as the containers are advanced on the conveyor up to a stationary platform 24, and as they are further advanced over the platform 24 by pressure applied to them by containers behind them on the moving conveyor. Thus, the surface of the platform 24 should have a low coefficient of friction to facilitate sliding of the containers 20.

Figure 5:
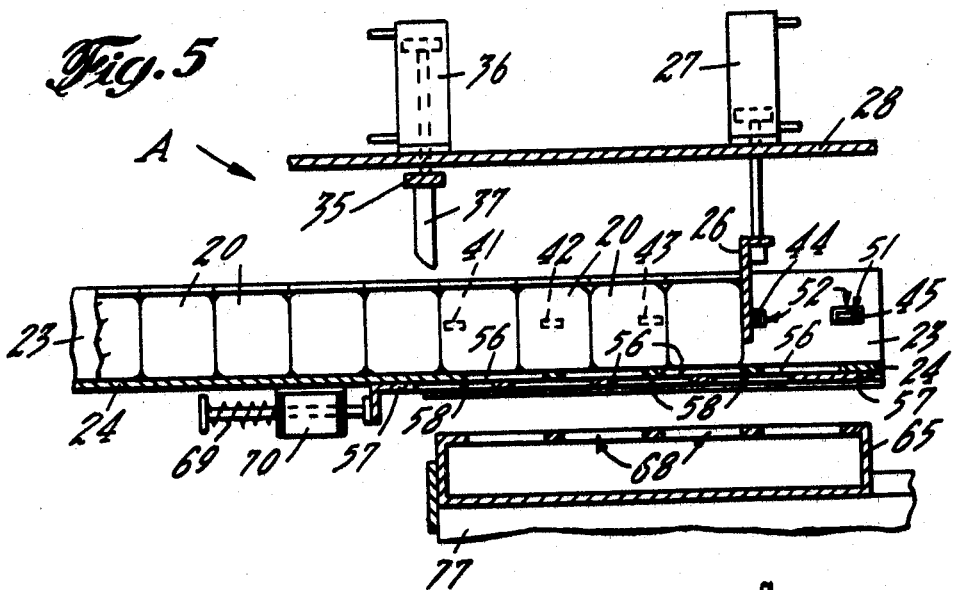
FIGS. 5, 6 and 7 are longitudinal elevational sections taken at 5—5 in FIG. 1, each showing parts in different positions.

The first, or leading row of four containers, is stopped by a gate 26 (FIGS. 1 and 5) suspended from the armature of a hydraulic device 27 mounted on a housing 28 and a pair of guide rods 29 slidably mounted in the housing.

As soon as progress of the containers is thus stopped by gates 26, a vertically disposed fork-shaped barrier 35, vertically reciprocable by a hydraulic device 36 mounted on the frame 28, is lowered by the device until the tines or fingers 37 of the barrier 35 penetrate interstices between four containers in each of two container rows a predetermined distance behind the leading row to cut off, in this instance, the four most advanced rows from the remainder of the procession of containers on the platform 24.

At this time the containers in the separated four advanced rows are already spaced apart laterally the desired distance by the spacer guides 23, but the containers in each lane are in close abutment longitudinally. To separate these abutting containers longitudinally by the desired spacing in the ultimate pattern, a plurality of parallel and horizontally disposed spacer bars 41, 42, 43, 44 and 45 are provided.

These bars extend transversely from a cross member 46, mounted for reciprocation by a hydraulic device 48 between a retracted position, shown at the left in FIGS. 1 and 3, and an advanced position, shown in FIG. 4. The leading end of each of these spacer bars is wedge shaped, as shown in FIG. 1, and the bars are progressively shorter from rearmost to foremost bar for purposes explained below.

After the gate 26 is raised by the hydraulic device 27, the spacer bars are moved transversely. Each of the bars 41, 42 and 43 has the apex 51 of its wedge-shaped end at the rearward side of the bar so that as bar 41 moves in behind the rearmost row of the advanced group of containers, its wedge shaped end, cooperating with and meshing with aligned apertures guides 23, causes the entire group to move forward progressively a distance equal to the width of the bar. Bar 42 follows bar 41 by about the diameter of one container to move the three forward rows ahead by the width of bar 42; and bars 43 and 44 follows, successively, to advance the first two rows and then the first row.

The apex 51 of the end of bar 45 is at the forward side of the bar so that its traverse of the forward end of this separated group of containers assures alignment of all containers in the first or foremost row of containers.

Figure 6:
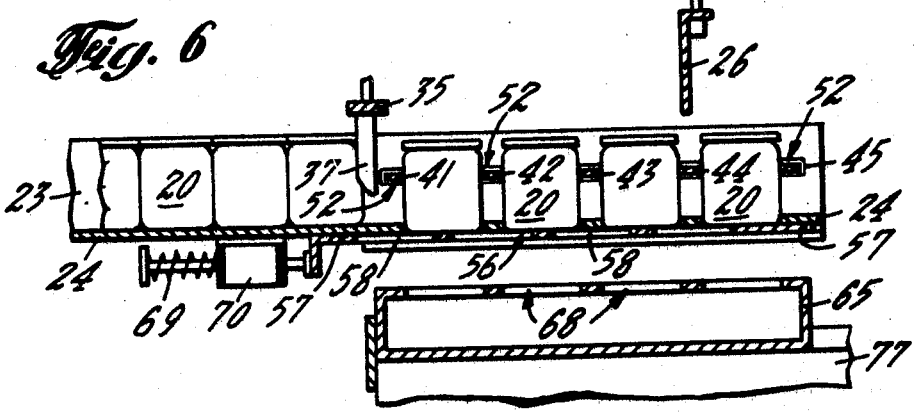

All of the containers in the separated group are now arranged in the desired pattern and, as shown in FIG. 6, each has dropped a short distance into an aperture 56 in the platform 24 and onto a reciprocably mounted plate 57 that is formed with apertures 58 of substantially the same size, and disposed in the same pattern and registrable with apertures 56. However, plate 57 is normally biased to its retracted position (FIGS. 5 and 6) when a solenoid 70 is deenergized. Apertures 58 are thus normally out of register with apertures 56 and the containers rest temporarily on the plate 57.

Figure 7:
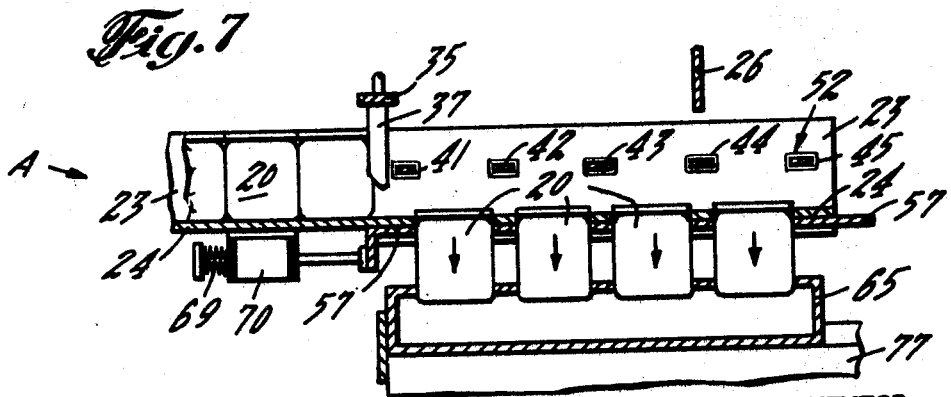

Meanwhile, a matrix 65 carried by a matrix return conveyor 66 is moved from the conveyor 66 to a position immediately under the containers resting on the plate 57 by a hydraulically actuated pusher 67. The matrix 65 is formed with pockets 68 of the same size and arranged in the same pattern as the containers, and each pocket is aligned with a container above it, so that, when the plate 57 is moved forward by an energized solenoid 70, as shown in FIG. 7, the containers drop from plate 57, through apertures 58 and into the pockets 68.

Matrix 65 is provided with slotted lugs 69 extending laterally therefrom, the slots being adapted to receive feed dogs 71 that are pivotally mounted on opposite sides of the matrix to a pair of dovetail slides 72.

Each dog 71 forms one arm of a bellcrank 73 whose other arm is a latch 74 that extends laterally from the pivot. The bellcrank is spring biased to the position shown in FIG. 8, with the dog 71 in vertical position.

A plurality of pairs of dogs 71 are mounted at appropriate intervals along the length of the reciprocable slides 72 for the purpose of intermittently advancing each matrix 65 from its rearmost position, at loading station A, successively to filling station C, capper station D, label applying station G, and container transfer station H, as hereinafter more fully described.

Figure 2:
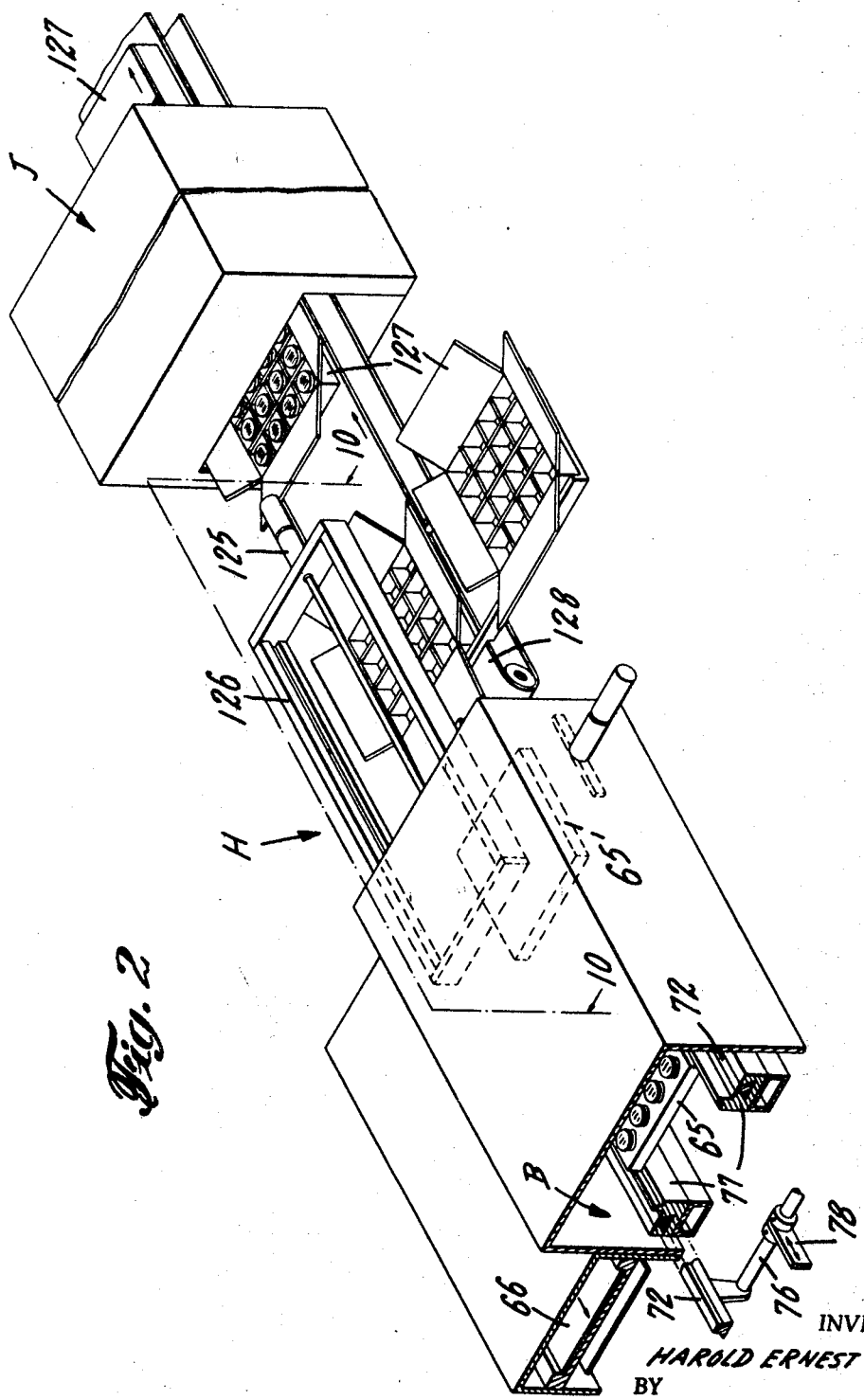
FIG. 2 is a continuation, and shows the remainder of the schematic representation illustrated in FIG. 1.

The dovetail slides, interconnected by a crossbar 76 (FIG. 2) and guided in ways 77, are reciprocated by any suitable means linked, as shown at 78, to the crossbar 76. As the slides are retracted, the rearmost pair of dogs 71 yield outwardly as they ride over the leading sides of the lugs 69, and then snap into the lug slots. On the forward stroke of slide 72, the dogs 71 carry the filled matrix 65 into the chamber B and to the filler station C therein.

While the containers are being filled, solenoids 81 are energized and trip bars 82 are drawn downwardly to engage the latch arms 74 and rock the dogs 71 out of engagement with lugs 69 of the matrix. On the return stroke of slide 72, another pair of dogs 71 engages the lugs 69, and the next forward stroke of the slide carries the matrix 65 and its filled containers to the capper station D.

Meanwhile, a cap matrix or magazine 85, loaded with caps 86, arranged and retained in the same pattern as the containers in matrix 65, is fed from a table 87 through a gate 88 onto a conveyor 89. If desired, more than one layer of caps may be placed in the matrix 85. Thus, the unloading of the matrix 85, as described hereinafter, may be altered in that the matrix 85 would not be removed from the capper station D until all the caps have been removed therefrom. The gate 88 is biased to closed position to prevent loss of pressurized wet sterile air, and raised only to admit a filled cap matrix.

Conveyor 89 carries the filled cap matrix 85 to a predetermined position laterally of matrix 65 at the capper station D (FIG. 8) by suitable stop means and directly below a cap transfer head 91. The caps on the matrix are thus in alignment with capper vacuum cups 92 secured, in the desired pattern, on the under side of a plate 93 that is yieldably mounted for vertical movement on the base of head 91, and biased to its uppermost position against the head. While being transferred on the conveyor 89, the caps 86 are also being sterilized in the pressurized wet sterile air or steam within the feed station E.

The plate 93 is lowered by energized solenoids 96, the armatures of which are linked at 97 to the plate, and each cup 92 is pressed against the upper surface of a cap in the matrix.

A vacuum pump or the like, not shown, in communication with each cup 92 through a tube 98 and a manifold 99, draws a partial vacuum in the cups to hold the caps thereon. The solenoids 96 are then deenergized and the plate is raised to its biased position against the head, lifting the caps to a level above, but laterally of the tops of the containers in matrix 65.

The now empty cap matrix 85 is removed from the conveyor through a gate 100, similar in operation and function to gate 88, by suitable reciprocating hinged claw means 103 or even by means of a manual hook.

The cap transfer head is mounted for transverse reciprocation along rails 101 by a hydraulic ram 102 between a pick-up position over the cap matrix (FIG. 8) to a capping position over the filled container matrix 65 (shown in dotted outline in FIG. 8). From their positions on vacuum cups 92 above their respective containers, the caps are lowered by energized solenoids 96 and pressed into sealed engagement onto the grouped filled containers by the cups 92 which thus also serve as cappers.

Solenoids 96 are then deenergized, plate 93 returns to its upper biased position, and head 91 is returned by ram 102 to its position over the next filled cap matrix 85 for repetition of the cycle.

Matrix 65, now holding filled and capped containers, is advanced by another pair of feed dogs 71 to label cutting and applying station G (FIGS. 1 and 9). At this station, a web of material 105, bearing potential label areas, is fed intermittently a predetermined distance across a die 106 (FIG. 9) to position the potential label areas over a group of die openings 107 disposed immediately below and in alignment with a cooperating group of punches 108 fixed to a punch plate 109 in the desired pattern. Plate 109 is yieldably held against the base of a label cutting and transfer head 111 constructed and operated in substantially the same manner as the cap transfer head 91 described above.

It is readily apparent that since the containers 20 are sealed when they enter the labeling station G, this station may be outside the sterile pressurized atmosphere chamber B used during filling and capping. Also, no pressurized atmosphere chamber B were used, the filled containers would be heat processed using an ordinary cooker technique, well known to those skilled in the art, after the capping operation.

In the station G, punches 108 are urged downwardly to cooperate with die 106 in cutting the label areas from the web 105. A partial vacuum in a bore 112 in each punch holds the labels 115 on the punches which are then raised, and the transfer head 111 is moved by a hydraulic ram 116, along transverse rails 117, to a labeling position shown at the left in FIG. 9. Here, the plate 109 descends and the labels 115, which are coated on their underside with pressure sensitive adhesive, are pressed against and adhere to the caps of the filled containers in the matrix 65. The vacuum in bores 112 is then broken, the punches 108 raised, and the head 111 is returned to its label cutting position for repetition of the cycle.

Figure 10:
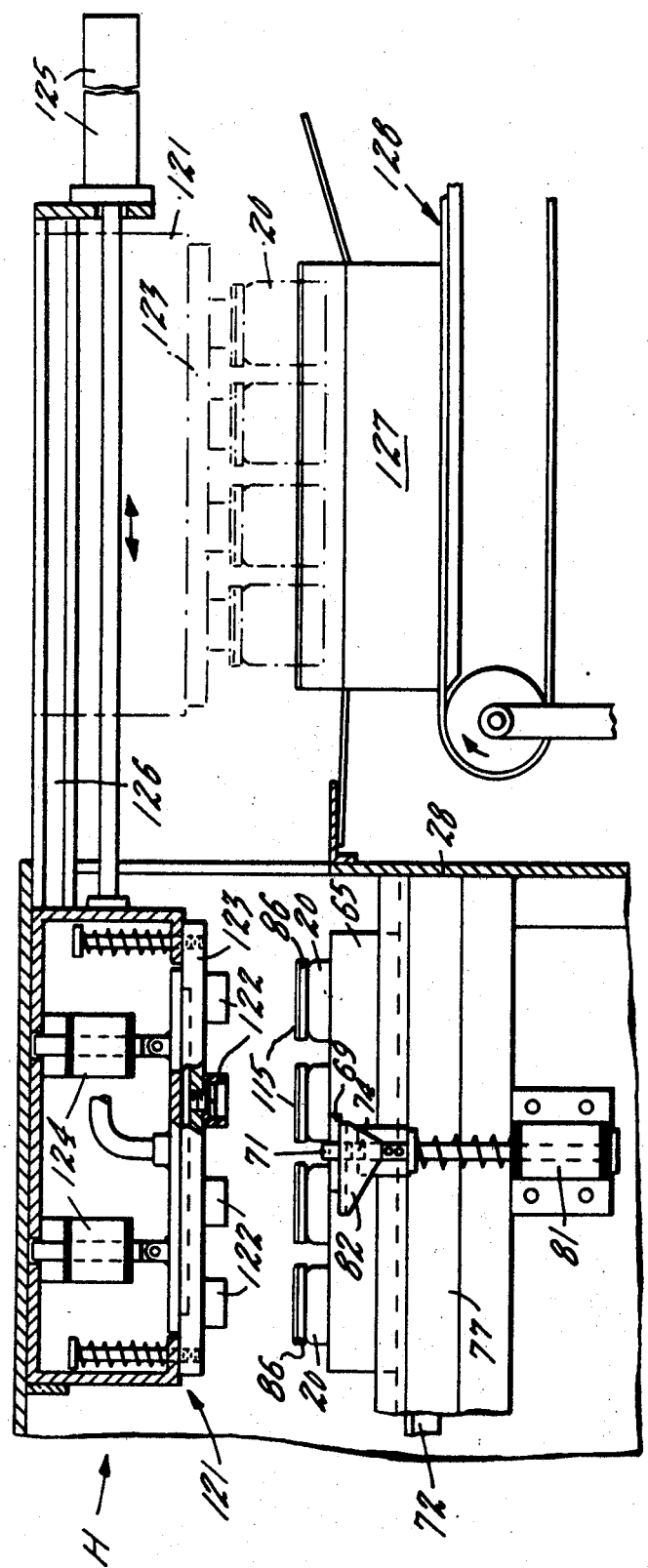
FIG. 10 is a longitudinal elevational section taken at 10—10 in FIG. 2.

Matrix 65, with its labeled containers, is now advanced by other sets of dogs 71 to container transfer station H (FIGS. 2 and 10), under a container transfer head 121, with each container cap in vertical alignment with a vacuum cup 122 fixed to a plate 123 on the underside of head 121.

The parts of head 121 are similar in design and function to those of like parts in heads 91 and 111. Vacuum cups 122 are lowered by solenoids 124 to gripping engagement with the tops of the container caps, then the cups are raised to lift all containers clear of the matrix 65. The head 121 and the suspended containers thereon, still arranged in the original pattern, are drawn by a hydraulic ram 125 along a track 126 to a carton loading position, shown in dotted outline in FIG. 10, over an open carton 127 resting on a conveyor 128.

Plate 123 is then lowered to deposit the containers in the carton; the vacuum in cups 122 is broken, and the plate and head return for repetition of their cycle.

The filled and open carton 127 is advanced by conveyor 128 to the carton sealing station J (FIG. 2) where the carton is closed and sealed, and then delivered to any suitable place of deposit by conveyor 128.

It is thought that the invention and many of its attendant advantages will be understood from the foregoing description and it will be apparent that various changes may be made in the form, construction and arrangement of parts and that changes may be made in steps of the method described and in their order of accomplishment without departing from the spirit and scope of the invention or sacrificing all of its material advantages, the form hereinbefore described being merely a preferred embodiment thereof.

I claim:

1. A method for simultaneously handling a plurality of substantially identical articles at a speed slower than each of said articles would be handled individually but at a greater through-put rate per article, comprising the steps of:
   feeding a plurality of articles in bulk form along a conveyor;
   arranging a first group of said articles in a predetermined pattern in which the articles are spaced from one another;
   transferring said first group of spaced articles into a reusable matrix while maintaining said predetermined pattern of said articles;
   moving said matrix into position in a work station while maintaining said predetermined pattern of said articles;
   holding said articles in said predetermined pattern in said work station;
   providing a supply of material adapted to define a second group of potential articles in a second matrix in which said second group of articles are part of said second matrix;
   feeding said first and second groups of articles in their respective matrixes to a transfer and assembling station;
   cutting said second group of articles from said second matrix whereby the cut articles are disposed in said second matrix in the same predetermined pattern as said first group;
   removing said second group of articles from said second matrix while retaining said articles in said pattern and transferring them to juxtaposition relative to the articles in said first group;
   simultaneously assemblying each of the articles in one group with an article of the other group while retaining all articles in said pattern;
   moving said first matrix and assembled articles from said work station;
   and removing said worked upon articles from said first matrix so that the now empty first matrix may be reused.

2. A method according to claim 1 comprising the additional step of recycling said matrix for use with another group of articles which have been fed by said conveyor and arranged in said predetermined and spaced pattern.

3. A method according to claim 1 wherein there are a plurality of work stations, intermittently advancing said matrix along a straight line path in passing through said plurality of work stations.

4. A method according to claim 1 including further advancing said matrix to a labeling station, and simultaneously applying labels to each of said articles in said matrix while in said labeling station.

5. A method for simultaneously handling a plurality of substantially identical articles at a speed slower than each of said articles would be handled individually but at greater through-put rate per article, comprising the steps of:
   feeding a plurality of articles in bulk form along a longitudinal conveyor;
   dividing said articles into a plurality of separate longitudinal lanes as they are fed by said conveyor;
   separating a group of articles from said bulk supply wherein said group comprises a plurality of adjacent lanes of contacting articles and a plurality of transverse rows of spaced articles;
   separating the article in a first row of a first lane from the remaining articles in said first lane;
   subseqently separating the article in said first row of a second lane from the remaining articles in said second lane and simultaneously separating the article in a second row of said first lane from the remaining articles in said first lane;
   subsequently, simultaneously separating the article in said first row of a third lane from the remaining articles in said third lane, the article in said second row in said second lane from the remaining articles in said second lane, and the article in a third row in said first lane from the remaining articles in said first lane;
   progressively continuing the aforesaid separating pattern until said group of articles are disposed in a predetermined pattern in which said articles are all spaced from one another;

transferring said group of spaced articles into a reusable matrix while maintaining said predetermined pattern of said articles;

moving said matrix into position in a work station while maintaining said predetermined pattern of said articles;

holding said articles in said predetermined pattern in said work station;

performing an identical work function on each of said articles substantially simultaneously while in said work station;

moving said matrix and articles from said work station;

and removing said worked upon articles from said matrix so that the now empty matrix may be reused.

References Cited

UNITED STATES PATENTS

| | | | |
|---|---|---|---|
| 2,838,896 | 7/1958 | Currivan | 53—166 |
| 3,270,487 | 9/1966 | Tchimenoglov et al. | 53—282 X |
| 3,327,450 | 6/1967 | Carter | 53—166 X |
| 2,153,039 | 4/1939 | Darling | 53—329 |
| 1,649,459 | 11/1927 | Fullips | 53—299 |
| 2,941,341 | 6/1960 | Clinton | 53—123 |
| 3,058,276 | 10/1962 | Palma | 53—281 X |
| 3,418,785 | 12/1968 | Duryee | 53—184 |

THERON E. CONDON, Primary Examiner

N. ABRAMS, Assistant Examiner

U.S. Cl. X.R.

53—37